United States Patent Office.

DUDLEY L. PAGE, OF LOWELL, MASSACHUSETTS.

Letters Patent No. 81,401, dated August 25, 1868.

IMPROVED CONFECTION.

The Schedule referred to in these Letters Patent and making part of the same.

TO ALL WHOM IT MAY CONCERN:

Be it known that I, DUDLEY L. PAGE, of Lowell, in the county of Middlesex, and State of Massachusetts, have invented and produced a new Composition of Matter, or Confection, which I term Maple-Chocolate Creams; and I do hereby declare that the following is a full and exact description thereof.

This invention consists of maple-sugar or sirup, which, after going through a process, as hereafter described, becomes what I term maple-cream, and pure chocolate.

To enable others skilled in the art to make and use my invention, I will proceed to describe its several parts, how prepared and compounded.

The sweetening and flavoring-properties, which may be either maple-sugar or sirup—"if sugar, a required quantity of water has to be used, to wit, one gallon of water to fifteen and one-half pounds of sugar"—are suitably prepared by boiling to a proper consistency.

The chocolate is melted to the consistency of glue.

These several ingredients, which are to form the confection "termed maple-chocolate creams," being thus prepared, are compounded as follows:

The maple-sugar or sirup, of the required quantity, is put into a suitable vessel, and heated to not less than 212° nor over 250° Fahrenheit, and kept in this heated state until the entire mass becomes boiled down to the proper consistency, this state being ascertained by putting a small quantity of the same into cold water, and if a soft ball can be made from the same, the vessel with its contents is removed from the stove or furnace, and poured from the same on to a marble slab or table, where it is left to cool. When cold, it is worked over and over, with a suitable instrument, to the consistency of dough, becoming quite hard.

By thus working this mass of boiled maple-sugar or sirup, bringing it to a doughy and hard state, makes it of light color, and the grain very fine and close.

Then a small quantity of this maple-cream, "so termed," is put into a smaller vessel, and gradually heated, "not letting it boil, and whilst heating being properly stirred," so that it can be poured from the same into moulds, made in different forms and shapes, as may be desired.

These moulds are made in common starch. After the maple-cream has been poured into the moulds, and becomes cold again, "this maple-cream forming the inside and shape of the drops or cakes, &c.," they are sifted from the starch and brushed clean, and, when in this condition, are ready to be coated with chocolate and finished.

Pure chocolate is put into a suitable vessel, which vessel fits into one of a larger size, and a quantity of water placed therein. A fire is placed under the vessel containing the water. The water becoming heated, imparts to the vessel which contains the chocolate the required amount of heat to melt the same to the consistency of glue.

The drops or cakes are then dipped into the melted chocolate, which completely coats them with the same; they are then drained, and when thoroughly drained are placed on sheet-tins to dry and become hard; then they are varnished over with a solution of gum-shellac and alcohol, with the assistance of a suitable brush, and when dry, they are then ready for the consumer. By thus varnishing the drops or cakes, it prevents the same from becoming soft, always keeping them in their required hard state.

The proportions of the above confection or maple-chocolate creams being, one part pure chocolate and nine parts maple-cream.

The proportions of the varnish, which prevents the same from melting when exposed to the atmosphere, being one ounce of gum-shellac to one pint alcohol. These proportions may be varied to suit the taste of the user.

What I claim as my invention or production, and desire to secure by Letters Patent, is—

A new and improved combination maple-chocolate cream, as herein described, using for that purpose the aforesaid ingredients or composition of matter, as a new article of confection, substantially as and for the purpose described.

DUDLEY L. PAGE.

Witnesses:
DANIEL SWETT, Jr.,
GEO. E. PEVEY.